United States Patent [19]

Desmarais

[11] Patent Number: 4,558,079
[45] Date of Patent: Dec. 10, 1985

[54] TAPE JOINT CEMENT COMPOSITION

[75] Inventor: Armand J. Desmarais, New Castle County, Del.

[73] Assignee: Hercules Incorporated, Wilmington, Del.

[21] Appl. No.: 686,060

[22] Filed: Dec. 24, 1984

Related U.S. Application Data

[63] Continuation-in-part of Ser. No. 573,458, Jan. 24, 1984, abandoned, and Ser. No. 466,196, Feb. 14, 1983, abandoned.

[51] Int. Cl.⁴ .............................................. C08L 3/02
[52] U.S. Cl. ..................................... 524/43; 106/197; 524/44; 536/90
[58] Field of Search .................... 536/90, 91; 524/43, 524/44; 106/141, 197, 199

[56] References Cited

U.S. PATENT DOCUMENTS

| | | |
|---|---|---|
| 3,296,247 | 1/1967 | Klug .................................. 106/197.1 |
| 3,835,074 | 9/1974 | Desmarais ............................ 260/17 |
| 3,873,518 | 3/1975 | Strange et al. ...................... 106/170 |
| 3,891,453 | 6/1975 | Williams .............................. 106/109 |
| 3,891,582 | 6/1975 | Desmarais ........................... 106/141 |
| 3,900,434 | 8/1975 | Bruschtein ......................... 260/17 R |
| 3,907,725 | 9/1975 | Forte ................................. 260/17 R |
| 3,998,769 | 12/1976 | Lane ............................. 260/17.4 ST |
| 4,415,683 | 11/1983 | Kernstock ............................. 524/43 |

Primary Examiner—Theodore Morris
Attorney, Agent, or Firm—Joanne L. Horn

[57] ABSTRACT

Tape joint cement compositions suitable for use with wallboard are disclosed wherein at least one hydroxypropylhydroxyethylcellulose having specified substitution levels is employed as the water retention aid and thickener. Blends of hydroxypropylhydroxyethylcellulose with (a) at least one cellulose ether, such as, hydroxyethylcellulose, hydroxypropylcellulose, methylcellulose, methylhydroxyethylcellulose, and methylhydroxypropylcellulose or (b) a hydroxyalkylguar, such as hydroxypropylguar and hydroxyethylguar are also disclosed.

15 Claims, No Drawings

TAPE JOINT CEMENT COMPOSITION

This application is a continuation-in-part of the application, Ser. No. 466,196, filed Feb. 14, 1983, for Tape Joint Cement Compositions, now abandoned and a continuation-in-part of the application, Ser. No. 573,458, filed Jan. 24, 1984 for Tape Joint Cement Compositions now abandoned.

This invention relates to compositions useful as tape joint sealing materials for the installation of wallboard paneling in residential, commercial, and industrial buildings. More specifically, it refers to such compositions wherein a cellulose derivative is employed to impart desirable properties thereto.

Since the end of the second World War, the use of wallboard has all but displaced plaster in erection of interior walls in the construction of buildings. Wallboard is generally installed in 4×8 foot panels which are nailed and glued to the studding of the wall and fitted together until the entire section of wall is covered. The joints where sections of board are butted together are covered with tape and then the taped joints and all nails are covered with a joint cement or spackling compound which, upon hardening, can be sanded smooth so that the taped joint is imperceptible when the wall is covered with paint or wallpaper.

At first, the joint cements employed with wallboard contained a resinous binder, limestone, clay, mica, a water-soluble polymer and asbestos as the principal ingredients, which were mixed with water to form a dope. Asbestos was included in these formulations for several purposes. Its primary functions, however, were to impart pseudoplasticity and to prevent sag when applied in a thick layer.

Over the past several years evidence that certain types of asbestos appear to have carcinogenic characteristics has led to its being banned altogether. Both prior to and when the ban became effective, efforts were made to find substitutes and many materials were evaluated as asbestos replacements. Today, the overwhelming product of choice in the joint cement industry to prevent sag is attapulgite clay, although other clays such as bentonite and montmorillonite, are still used. Kaolin clay is also frequently used in conventional joint cements. However, it is added since it is a readily available, inexpensive filler and not to prevent sag in the joint cement.

Attapulgite clay is acicular and has an extremely high surface area in relationship to its weight. Hence, all water-soluble polymers used as thickeners or water retention aids in joint cements are attracted to the surface of the clay particles to some degree. The extent or degree of adsorption of the water-soluble polymer on the surface of the attapulgite clay is related to the charge of the polymer, the density of the charge, and the hydrogen bonding capability of the polymer.

Adsorption of the water-soluble polymer on the surface of the attapulgite clay can lead to mild flocculation which may manifest itself as "livering" in the joint cement. The flocculated particles leave crevices or voids which, when the cement is dried, result in cracks on the surface of the cement.

Prior to the change from asbestos to attapulgite clay, cellulose derivatives, namely, methylhydroxypropylcellulose (MHPC) and hydroxyethylcellulose (HEC) were the principal thickeners used in joint cements. After the change to attapulgite clay, MHPC became the favored thickener since HEC adsorbs on the surface of the attapulgite clay at about twice the rate as MHPC.

According to this invention, a cellulose derivative has now been found which has less tendency to adsorb on the surface of clays, particularly attapulgite, than either HEC or MHPC. Specifically, this invention relates to joint cement compositions based on a resinous binder; mica; and a clay selected from the group consisting of attapulgite, bentonite and montmorillonite clays; limestone; and at least one water-soluble modified hydroxyethylcellulose containing clearly defined amounts of an additional substitutent group or blends thereof with at least one other cellulose ether or with a hydroxyalkylguar as the major dry components. More specifically, the modified hydroxyethylcellulose is one having a hydroxypropyl substituent in addition to the hydroxyethyl group. In particular, the modified hydroxyethylcellulose is one having hydroxyethyl substitution from about 0.5 to about 4.0 M.S. and a hydroxypropyl substitution greater than 0.36 M.S., preferably greater than 0.6 M.S. Most preferably, the hydroxyethyl M.S. will be from 0.8 to about 1.8 and the hydroxypropyl M.S. will be from about 0.8 to about 1.5. The molecular substitution (M.S.) is defined as the average number of moles of hydroxyethyl or hydroxypropyl substituent groups present per anhydroglucose unit of the cellulose molecule.

In another embodiment of this invention the hydroxypropylhydroxyethylcellulose is admixed with from about 5% to about 75% of at least one cellulose ether, based on the total thickener weight, such as, hydroxyethylcellulose, hydroxypropylcellulose, methylcellulose, methylhydroxyethylcellulose and methylhydroxypropylcellulose. Preferably from about 25% to about 50% of at least one cellulose ether is employed. Typically, the total M.S. of such ethers is from about 1.5 to about 4.0, preferably from about 1.8 to about 3.0. The cellulose ethers having methyl or ethyl substituent groups typically have a degree of substitution (D.S.) from about 0.4 to about 2.0, preferably from about 0.9 to about 2.0. D.S. is the number of hydroxyl groups per anhydroglucose unit of the cellulose molecular reacted with methyl or ethyl.

In yet another embodiment of this invention the hydroxypropylhydroxyethylcellulose is admixed with from 5% to about 75%, based on the total thickener weight, of a hydroxyalkylguar, such as hydroxypropylguar and hydroxyethylguar, having an M.S. of from about 0.1 to about 1.2. Preferably, the hydroxyalkylguar is present in an amount from 25% to about 50% and has an M.S. from about 0.1 to about 0.5. Hydroxypropylguar is preferred.

Joint cements are marketed as fully formulated, ready-to-use cement, i.e., already containing water, and as a dry powder to which water is added at the time of use. The invention includes such dry powders as well as the fully formulated cements. Joint cement compositions of this invention are substantially equivalent in performance to those which are presently available commercially.

In commercial practice the concentrations of the principal ingredients can and do vary widely between suppliers and depending on the intended end use, i.e., whether it is for patching holes, covering nail pops, or for initially covering taped joints,. In most commercial formulations, the principal ingredients, which should add up to 100%, are within the following concentration ranges:

| Ingredients | % by weight based on the dry ingredients |
| --- | --- |
| Limestone | 40 to 95 |
| Mica | 2 to 10 |
| Kaolin Clays | 1 to 20 |
| Attapulgite Clays | 1 to 8 |
| Binder (solids) | 2 to 15 |
| Thickener | 0.2 to 2.0 |

Bentonite and montmorillonite clays can be used to replace all or part of the attapulgite clay.

If the product is to be sold as a ready-mix formulation, water in the amount of about 22% to about 35%, based on the total weight of the composition, is added and thoroughly mixed.

All compositions within the limits described above are suitable for manual application by troweling. When they are to be applied mechanically, additional water can be added at the job site just prior to use.

The modified hydroxyethylcellulose which can be used as thickeners in the cements of this invention is prepared by reacting ethylene oxide and propylene oxide with cellulose in a strongly alkaline medium. Specific techniques for carrying out the etherification are well known in the art and any known procedure can be employed.

In the alternative, a hydroxyethylcellulose can be etherified with a propylene oxide in a strongly alkaline medium. In this case, the hydroxyethylcellulose can be substantially any grade having M.S. from about 0.5 to about 4.0. The preferred materials are those having a Brookfield viscosity from about 400 to about 5000 centipoise in a 1% water solution at room temperature (23° C.). Materials of higher and lower viscosity can also be used advantageously, however.

The concentration of (1) the hydroxypropylhydroxyethylcellulose, (2) mixtures thereof, or (3) blends of the hydroxypropylhydroxyethylcellulose with at least one cellulose ether or with a hydroxyalkylguar, in the compositions of this invention is from about 0.2% to about 2.0% by weight based on the dry ingredients, desirably from about 0.5% to about 1.0%.

The resinous binder is normally a coalescable vinyl material, preferably poly(vinyl acetate) or an ethylene-vinyl acetate copolymer, which upon drying or curing of the cement forms a thin matrix to hold the clay, limestone, etc. together. When a fully formulated mix is being prepared, an aqueous latex binder is usually added. In the case of dry mixes, the binder is added as dried resin particles. Other materials useful as the binder include, e.g., starch, casein, polyvinyl alcohol, polyacrylamide, and copolymers of acrylamide and acrylic acid.

In addition to the principal ingredients mentioned above, a typical joint cement will frequently also contain small amounts of conventional additives, such as dispersants, defoamers, preservatives, pH control agents, and processing aids to improve open time. Suitable dispersants include the polymerized alkaline salts of a sulfonic acid. Silica dispersed in a liquid hydrocarbon is a typical defoamer. Typical preservatives include 1-(3-chloroallyl-triaza-1-azoniaadamantane)chloride. Alkaline salts may be used as pH control agents. Propylene glycol is a suitable process aid to improve open time.

Small amounts of polyacrylamide can be added to further improve the sag resistance of the cement.

The following examples are illustrative of the invention. All parts and percentages used in this disclosure are by weight unless otherwise indicated.

EXAMPLE 1

The following example illustrates a specific embodiment of the joint cement composition of this invention and how to prepare it.

A joint cement using the formulation set forth in Table I is prepared by charging a mixing apparatus with the water and latex binder and mixing for a short time (about 1 min.). The defoamer, preservative, and processing aid are then added.

All of the dry ingredients are dry blended by tumbling in a tumbler, and then incrementally adding the dry mixture to the stirred liquids.

After the addition of the dry ingredients is complete, the mix is stirred for about 10 minutes at low speed with occasional stopping to scrape down the sides of the bowl or until a homogeneous mixture is obtained.

TABLE I

| Ingredients | % by weight based on the ingredients minus water |
| --- | --- |
| Limestone | 83.5 |
| Mica | 6.5 |
| Attapulgite clay | 3.4 |
| Latex binder (solids) | 3.35 |
| Defoamer | 0.2 |
| Preservative | 0.05 |
| Alkaline salt | 0.9 |
| Propylene glycol | 1.5 |
| Hydroxypropylhydroxyethylcellulose (0.93 hydroxyethyl M.S.; 1.17 hydroxypropyl M.S.) | 0.6 |
| Water | 33.6* |

*By weight of the total composition

EXAMPLES 2-8

In Examples 2 to 8, the procedure of Example 1 and the formulation of Table 1 are used except that a hydroxypropylhydroxyethylcellulose having the hydroxyethyl M.S. and the hydroxypropyl M.S. shown in Table II for the particular example in question is used instead, and except that 0.9% of the hydroxypropylhydroxyethylcellulose is used in Example 8 instead of 0.6%.

To characterize the compositions of this invention, the following tests are used:

Viscosity: measured in Brabender units (B.U.) determined by ASTM C474-67.

Cracking: Panels are dried in an essentially vertical position with a current of air from a 14 inch oscillating fan forced across their face from about 30 inches for 45 minutes. The panels are then allowed to dry overnight in the vertical position without the air current. Ratings are assigned subjectively as: 1=none, 2=very slight, 3=slight, 4=moderate, and 5=severe.

Sag resistance: Panels of the cement about $4 \times 5 \times \frac{1}{8}$ inch are cast. Sag resistance is rated as good, fair or poor by observing the degree of slump of the sharp edges of the cast cement.

Adhesion: Determined according to ASTM C474-67.

Appearance (texture): The appearance or texture is observed and ratings are assigned as: 1=smooth, creamy, 2=very slight grainy, 3=slightly grainy, 4=moderate grainy, and 5=very grainy.

Gelatin (livering): A subjective test in which the amount of gelation observed is rated using the same ratings as used for the cracking test above.

Adsorption on clay: A standard curve of each polymer to be tested is prepared by taking solutions at 0.05, 0.025, 0.01, 0.005, 0.0025, 0.0005, and 0.00025% concentrations; placing 1.0 ml of each solution into separate test tubes; adding 1.0 ml of a 5.0% phenol solution to each test tube and mixing thoroughly by shaking; adding 5.0 ml of concentrated $H_2SO_4$ to each test tube and mixing thoroughly by shaking; letting the tubes stand for 10 minutes; reshaking; placing the tubes in a water bath at 25° C. for 20 minutes; measuring the optical density at 490 nm on a B&L spectrometer; and plotting the concentration vs. optical density.

The clay adsorption is measured by adding 10.0 g of a sheared clay slurry at 10.0% concentration plus 9.0 g distilled water to a centrifuge tube; adding 18 g of a polymer solution at 0.05% concentration to the tube; mixing contents by shaking; letting the tube stand for 2 hours; reshaking; centrifuging at 10,000 RPM in a Sorvall centrifuge for 30 minutes; taking 1.0 ml of clear supernatant liquid and repeating the procedure given in the preceding paragraph; and determining the concentration in the supernatant by plotting on standard curve. The concentration of polymer adsorbed on the clay can be determined by difference between the polymer concentration originally and the polymer concentration in the supernatant.

The concentration of the clay slurry or the polymer solution or both may have to be varied depending upon the degree of polymer adsorption on the clay surface.

The properties of the compositions of Examples 1 through 8 are shown in Table II. The control examples are prepared according to the procedure of Example 1, and the formulation of Table I except that hydroxyethylcellulose (Control 1), methylhydroxypropylcellulose (Controls 2 and 3) and ethylhydroxyethylcellulose (Control 4) having the M.S. and/or D.S. indicated in Table II are used instead of the hydroxypropylhydroxyethylcellulose.

EXAMPLE 9

This Example illustrates another embodiment of this invention.

The procedure of Example 1 and the formulation of Table I are used except that a blend of (a) 0.15% of a hydroxypropylhydroxyethylcellulose having a hydroxypropyl M.S. of 0.8 and a hydroxyethyl M.S. of 0.8, and (b) 0.45% of a hydroxypropylhydroxyethylcellulose having a hydroxypropyl M.S. of 1.30 and a hydroxyethyl M.S. of 1.70 are used instead of the hydroxypropylhydroxyethylcellulose set forth in Table I.

EXAMPLE 10

This Example illustrates another embodiment of this invention.

The procedure of Example 1 and the formulation of Table I are used except that a blend of (a) 0.15% of a hydroxyethylcellulose having a hydroxyethyl M.S. of 2.8, and (b) 0.45% of a hydroxypropylhydroxyethylcellulose having a hydroxypropyl M.S. of 1.30 and a hydroxyethyl M.S. of 1.70 are used instead of the hydroxypropylhydroxyethylcellulose set forth in Table I.

EXAMPLE 11

This Example illustrates another embodiment of this invention.

The procedure of Example 1 and the formulation of Table I are used except that a blend of (a) 0.15% of a hydroxypropylguar having a hydroxypropyl M.S. of 0.2, and (b) 0.45% of a hydroxypropylhydroxyethylcellulose having a hyroxypropyl M.S. of 1.17 and a hydroxyethyl M.S. of 0.93 are used instead of hydroxypropylhydroxyethylcellulose set forth in Table I.

EXAMPLE 12

This Example illustrates another embodiment of this invention.

The procedure of Example 1 and the formulation of Example 10 are used except that 0.3% of each of (a) and (b) are present instead of 0.15% and 0.45%, respectively.

TABLE II

| Example Number | HE M.S. | HP M.S. | M D.S. | E D.S. | Viscosity | Cracking[A] | Sag Resistance[C] | Adhesion | Appearance[B] | Gelation[A] (livering) | Adsorption on Clay |
|---|---|---|---|---|---|---|---|---|---|---|---|
| 1 | 0.93 | 1.17 | — | — | 480 | 1 | G | Good | 1 | 1 | 0.0193 |
| 2 | 0.93 | 0.42 | — | — | 640 | 1 | G | Good | 5 | 5 | 0.0549 |
| 3 | 0.94 | 1.14 | — | — | 400 | 3 | G | Good | 3 | 1 | 0.0300 |
| 4 | 1.31 | 1.08 | — | — | 500 | 2 | G | Good | 1 | 1 | 0.0266 |
| 5 | 1.47 | 0.74 | — | — | 490 | 1 | G | Good | 1 | 2 | 0.0244 |
| 6 | 1.58 | 1.13 | — | — | 480 | 4 | G | Good | 2 | 1 | 0.0199 |
| 7 | 1.77 | 0.83 | — | — | 540 | 3 | G | Good | 1 | 2 | 0.0266 |
| 8 | 1.70 | 1.30 | — | — | 510 | 1 | G | Good | 1 | 1 | 0.0196 |
| Control | | | | | | | | | | | |
| 1 | 2.50 | — | — | — | 550 | 3 | G | Good | 1 | 5 | 0.0600 |
| 2 | — | 0.15 | 1.85 | — | 540 | 2 | G | Good | 1 | 1 | 0.0320 |
| 3 | — | 0.90 | 1.30 | — | 540 | 2 | G | Good | 1 | 2 | ~0.0400 |
| 4 | 1.50 | — | — | 0.90 | 550 | 3 | G | Good | 2 | 2 | ~0.0400 |

[A] 1 = none
2 = very slight
3 = slight
4 = moderate
5 = severe
[B] 1 = smooth, creamy
2 = v. sl. grainy
3 = sl. grainy
4 = mod. grainy
5 = very grainy
[C] G = good
F = fair
P = poor The properties of the compositions of Examples 9 through 12 are shown in Table III.

TABLE III

| Example Number | Viscosity | Cracking[A] | Sag Resistance[C] | Adhesion | Appearance[B] | Gelation[A] (livering) | Adsorption on Clay |
|---|---|---|---|---|---|---|---|
| 9 | 490 | 1 | G | Good | 1 | 1 | 0.0193 |
| 10 | 540 | 1 | G | Good | 5 | 5 | 0.0549 |
| 11 | 560 | 3 | G | Good | 3 | 1 | 0.0300 |
| 12 | 510 | 2 | G | Good | 1 | 1 | 0.0266 |

[A] 1 = none
2 = very slight
3 = slight
4 = moderate
5 = severe
[B] 1 = smooth, creamy
2 = v. sl. grainy
3 = sl. grainy
4 = mod. grainy
5 = very grainy
[C] G = good
F = fair
P = poor Features, advantages and other specific embodiments of this invention will become readily apparent to those exercising ordinary skill in the art after reading the foregoing disclosures. In this regard, while specific embodiments of this invention have been described in considerable detail, variations and modifications of these embodiments can be effected without departing from the spirit and scope of the invention as disclosed and claimed.

I claim:

1. In joint cement composition having limestone; mica; a clay selected from the group consisting of attapulgite, bentonite, montmorillonite and mixtures thereof; a thickener, and a resinous binder as its principal ingredients, the improvement which comprises using from about 0.2% to about 2.0%, by weight based on the dry ingredients, of at least one hydroxypropylhydroxyethylcellulose having a hydroxyethyl substitution from about 0.5 to about 4.0 M.S. and a hydroxypropyl substitution greater than 0.36 to about 1.5 M.S. as a water retention aid and thickener.

2. The composition of claim 1 wherein the hydroxypropylhydroxyethylcellulose has a hydroxypropyl substitution greater than 0.6 M.S.

3. The composition of claim 2 wherein the hydroxypropylhydroxyethylcellulose has a hydroxyethyl M.S. from about 0.8 to about 1.8 and a hydroxypropyl M.S. from about 0.8 to about 1.5.

4. The composition of claim 1 wherein the hydroxypropylhydroxyethylcellulose is present at a concentration from about 0.5% to about 1.0%.

5. In joint cement composition having limestone; mica; a clay selected from the group consisting of attapulgite, bentonite, montmorillonite and mixtures thereof; a thickener; and a resinous binder as its principal ingredients, the improvement which comprises using from about 0.2% to about 2.0%, by weight based on the dry ingredients, of a mixture of (a) at least one hydroxypropylhydroxyethylcellulose having a hydroxyethyl substitution from about 0.5 to about 4.0 M.S. and a hydroxypropyl substitution greater than 0.36 to about 1.5 M.S., and (b) a cellulose ether, having a total M.S. from about 1.5 to about 4.0 and, optionally, a D.S. from about 0.4 to about 2.0, as a water retention aid and thickener.

6. The composition of claim 5 wherein the hydroxypropylhydroxyethylcellulose has a hydroxypropyl substitution greater than 0.6 M.S.

7. The composition of claim 6 wherein the hydroxypropylhydroxyethylcellulose has a hydroxyethyl M.S. from about 0.8 to about 1.8 and a hydroxypropyl M.S. from about 0.8 to about 1.5.

8. The composition of claim 5 wherein the cellulose ether is selected from the group consisting of hydroxyethylcellulose, hydroxypropylcellulose, methylcellulose, methylhydroxyethylcellulose and methylhydroxypropylcellulose.

9. In joint cement composition having limestone; mica; a clay selected from the group consisting of attapulgite, bentonite, montmorillonite and mixtures thereof; a thickener, and a resinous binder as its principal ingredients, the improvement which comprises using from about 0.2% to about 2.0%, by weight based on the dry ingredients, of a mixture of (a) at least one hydroxypropylhydroxyethylcellulose having a hydroxyethyl substitution from about 0.5 to about 4.0 M.S. and a hydroxypropyl substitution greater than 0.36 to about 1.5 M.S. and (b) a hydroxyalkylguar selected from the group consisting of hydroxypropylguar and hydroxyethylguar having an M.S. from about 0.1 to 1.2 as a water retention aid and thickener.

10. The composition of claim 9 wherein the hydroxypropylhydroxyethylcellulose has a hydroxypropyl substitution greater than 0.6 M.S.

11. The composition of claim 10 wherein the hydroxypropylhydroxyethylcellulose has a hydroxyethyl M.S. from about 0.8 to about 1.8 and a hydroxypropyl M.S. from about 0.8 to about 1.5.

12. The composition of claim 9 wherein the hydroxyalkylguar is a hydroxypropylguar having a hydroxypropyl M.S. from about 0.1 to about 0.5.

13. The composition of claim 1 wherein said dry ingredients are mixed with sufficient water to produce a viscosity of about 400 to about 640 Brabender units.

14. The composition of claim 9 wherein said dry ingredients are mixed with sufficient water to produce a viscosity of about 400 to about 640 Brabender units.

15. The composition of claim 5 wherein said dry ingredients are mixed with sufficient water to produce a viscosity of about 400 to about 640 Brabender units.

* * * * *